(12) United States Patent
Trimble et al.

(10) Patent No.: US 6,880,449 B1
(45) Date of Patent: Apr. 19, 2005

(54) CENTER SECTION AND RUNNING COMPONENTS FOR HYDROSTATIC UNIT AND METHOD OF MANUFACTURE

(75) Inventors: Robert E. Trimble, Sullivan, IL (US); Raymond M. Hauser, Sullivan, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 0 days.

(21) Appl. No.: 10/289,102

(22) Filed: Nov. 6, 2002

Related U.S. Application Data

(62) Division of application No. 09/822,571, filed on Mar. 30, 2001, now abandoned.

(51) Int. Cl.$^7$ ................................. F01B 3/10
(52) U.S. Cl. ........................................ 91/503
(58) Field of Search .......... 60/487, 488; 92/71; 91/503

(56) References Cited

U.S. PATENT DOCUMENTS

| | | | |
|---|---|---|---|
| 3,360,933 A | * | 1/1968 | Swanson et al. .............. 60/488 |
| 4,263,814 A | | 4/1981 | Takaoka et al. |
| 4,496,401 A | | 1/1985 | Dawes et al. |
| 4,596,611 A | | 6/1986 | Dawes et al. |
| 5,314,387 A | | 5/1994 | Hauser et al. |
| 5,392,670 A | | 2/1995 | Hauser |
| 5,714,015 A | * | 2/1998 | Lentz .......................... 148/218 |
| 5,809,863 A | | 9/1998 | Tominaga et al. |
| 5,979,270 A | | 11/1999 | Thoma et al. |
| 6,122,996 A | | 9/2000 | Hauser et al. |
| 6,158,561 A | | 12/2000 | Sakai et al. |
| 6,196,109 B1 | | 3/2001 | Zumbusch et al. |

OTHER PUBLICATIONS

Surface HArdening of Steel, in Metals Handbook, vol. 2 (American Society of Metals, 1978) pp. 527-528, TA472A3.*
General Magnaplate, "Magnaplate Coatings," Web Page—magnaplate.com/coatings, 2001.
Exatron Inc., "Aluminum Output Tubes," Web Page—exatron.com/products, 1996-2003.
General Magnaplate, Nedox, "Synergistic Surface Enhancement Coatings Protect Most Metals—Including Aluminum—Against Wear, Corrosion, Sticking and Galling," brochure, U.S.A., 2000, 1999, 1998.

* cited by examiner

Primary Examiner—F. Daniel Lopez
(74) Attorney, Agent, or Firm—Neal, Gerber & Eisenberg, LLP

(57) ABSTRACT

A hydrostatic unit comprising a surface coating on a running surface. A center section or valve plate for use in a hydrostatic transmission is improved through application of the surface coating on one or both of its pump running surface and motor running surface. The end cap for a hydrostatic pump is improved in a like manner.

2 Claims, 14 Drawing Sheets

CENTER SECTION AND RUNNING COMPONENTS FOR HYDROSTATIC UNIT AND METHOD OF MANUFACTURE

RELATED APPLICATIONS

This application is a divisional of and claims priority to U.S. application Ser. No. 09/822,571 filed Mar. 30, 2001, now abandoned, which is incorporated herein by reference in its entirety.

FIELD OF THE INVENTION

The present invention relates to an improved design of hydrostatic units. Specific exemplary embodiments discussed relate to hydrostatic transmissions and to stand-alone hydrostatic pumps.

BACKGROUND OF THE INVENTION

This invention relates to an improved design of hydraulic pumps and motors, either as a stand-alone pump or motor or in combination as a transmission, and a method of manufacturing such pumps, motors and transmissions. The inventions described herein may also be adapted for use in an integrated hydrostatic transmission (IHT), wherein a hydraulic transmission is incorporated in a single housing with output gearing and one or more axles. Hydrostatic units such as these are used in a variety of vehicle and industrial applications, including lawn and garden tractors, zero-turn units, snow throwers, and other apparatus where hydraulic and hydrostatic power may be used. Applications of the invention will be described with respect to an HST to convey the fundamental nature of the invention.

In general an HST has a hydraulic pump and a hydraulic motor mounted in a housing. The pump and motor are hydraulically linked through a generally closed circuit; both consist of a rotatable body with pistons mounted therein. The pump and motor are rotatably mounted on a center section, which acts to form a closed circuit in conjunction with the pump and motor.

Hydraulic fluid such as oil is maintained in the aforementioned closed circuit. The HST generally has a sump or reservoir with which the closed circuit can exchange oil. This sump may be formed by the housing itself.

The pump is driven by means of a pulley and belt, a shaft, or other connective means associated with a motive source. The motive force is often provided by an internal combustion engine, but may also be an electric motor. The pump pistons engage a moveable swash plate as the pump is rotated by an input shaft driven by the external engine. Other HST designs may use other pump configurations, but the general operations are similar in that the wear surfaces associated with hydraulic and hydrostatic pumps and motors are similar to those described herein and may benefit from the teachings described herein.

In an HST, movement of the pump pistons creates movement of the hydraulic fluid from the pump to the motor, causing rotation thereof. The motor pistons are engaged against a plate that may be at a fixed angle, and rotation of the motor drives an output shaft engaged thereto. This output shaft may be linked to mechanical gearing and to one or more output axles, which may be internal to the HST housing, or may be external thereto.

The pump/motor system is fully reversible in a standard HST. As the swash plate against which the pump pistons move is moved, the rotational direction of the motor may be changed. In addition, there is a "neutral" position where the pump pistons are not moved in an axial direction, so that rotation of the pump does not create any movement of the hydraulic fluid.

The hydrostatic closed circuit has two sides, namely a high pressure side in which oil is being pumped from the pump to the motor, and a low pressure or vacuum side, in which oil is being returned from the motor to the pump. When the swash plate angle is reversed, the flow out of the pump reverses so that the high pressure side of the circuit becomes the vacuum side and vice versa. This hydraulic circuit can be formed as porting within the housing, or internal to a center section on which the pump and motor are rotatably mounted, or in other ways known in the art. Check valves are often used as an inlet to draw hydraulic fluid into the low pressure side to make up for fluid lost, for example, due to leakage. Such check valves may be located so that they directly contact the porting or may be located separate from the porting and connected through additional bores to the closed circuit.

A center section for use in an HST or IHT may be various shapes, including a flat plate such as is shown in U.S. Pat. No. 5,392,670 or an offset design, as shown in U.S. Pat. No. 5,314,387, both incorporated herein by reference along with U.S. Pat. No. 6,122,996. It is currently preferred to manufacture such center sections from aluminum, which provides for a unit that is easy to cast and to machine to final form. Aluminum is also lighter and easier to handle than other materials, such as cast iron, which are also used to make such center sections.

This invention also relates to cast iron "end caps" which are used in stand-alone hydraulic pumps and in hydraulic transmissions, and on which the rotating cylinder block is mounted. The end cap functions much as a center section in that it provides both porting and support for the cylinder blocks.

A problem with the aforementioned cast iron end caps is their tendency to corrode, amplified by typical operating environments. Such corrosion typically does not affect performance, but does affect visual appearance and thus customer satisfaction and ultimately unit sales.

Painting of end caps is routinely done for appearance, as the cast iron rusts readily in exposure to humidity. Painting, however, must be kept from the running surfaces to prevent undesirable contamination and degradation of performance characteristics. The gerotor and block running surfaces are typically masked, or treated, to avoid paint adhering to the surfaces; such masking and treatment requires specific facilities for painting and adds labor costs to control where the paint is applied. Some manufacturers paint the end cap after it has been assembled into a hydrostatic unit. Such painting and handling entails a variety of problems, including that of limiting paint to only the part at issue, namely the end cap, and painting of bulky and heavy hydrostatic units. Thus there is a need to eliminate the foregoing problems associated with end caps and other problems as well.

The use of aluminum for a center section or end cap has certain drawbacks. For example, aluminum is significantly less robust than cast iron. Gouging or scarring of the center section can occur more readily with aluminum under certain loading or contamination conditions. As is generally known, the center section and the rotating pump and motor may be mounted in a sump which contains the hydraulic oil used for the hydrostatic transmission. In many designs this hydraulic oil is also used to lubricate the gearing and/or differential for the transaxle. The motion of the pump and motor requires a thin hydrodynamic film of oil where the pump and motor contact the aluminum center section. Particles in the oil can break down the hydrodynamic film and damage the center section. The problem is greater at higher temperatures where the oil viscosity is lower and thus the hydrodynamic film thickness decreases.

One alternative design that capitalizes on the advantages of an aluminum center section is to include a valve plate between the pump and the center section against which the pump runs. The valve plate would be made of a more durable material than aluminum to address the problems listed above. Valve plates used with previous hydrostatic units are generally of a bi-metal configuration, having one side composed of bronze and the other side of steel. The bronze forms a better running surface than steel. The steel substrate is required to prevent the flexure of the plate under some operating conditions. One problem that has arisen with such bi-metal valve plate construction is that the different metals have different expansion coefficients, and at elevated temperatures the relative expansion rates of the two metals cause the valve plate to bend or warp. Such bending ultimately causes performance problems, and causes such valve plates to have an operational temperature limit. This invention overcomes the limitation of the bi-metal valve plate design while retaining wear characteristics.

Additionally, the valve plate and the surface on which it is mounted must be held sufficiently flat to prevent high pressure fluid from building up under, and lifting, the valve plate. Once the valve plate is lifted, system pressure is lost, performance is reduced and the various hydraulic components may experience permanent damage.

Therefore, it is clear that there exists a need for a method of improving the wear characteristics of the materials used in conjunction with center sections, end caps, valve plates, and other components on which hydraulic components operate.

SUMMARY OF THE INVENTION

The components noted above are provided with treatments in order to address the aforementioned problems. More specifically, the present invention provides for a coating of a separate material to be applied to a center section or other mounting member to improve characteristics such as durability. As used herein, the term center section should be read to include any type of separate plate or block that satisfies the functions discussed in the background as well as other functions known to those of ordinary skill in the art.

Coatings that could be used for this process include ceramic, zinc plating, chromium, and nitrogen carburization; more generally, a material need only exhibit acceptable surface and/or frictional characteristics for the specific application in question. For some applications, it is desirable to prepare the surface of the component prior to applying the separate coating. For example, an aluminum center section benefits from a nickelizing coating for adherence of a surface coating such as chromium. A cast iron end cap may need surface corrosion removed before application of zinc plating.

Thus, a hydrostatic unit according to the teachings herein may comprise a rotatable component of a device selected from the group consisting of a hydrostatic motor and hydrostatic pump. The rotatable component may, for example, be a cylinder block of a hydrostatic pump. The hydrostatic unit also comprises a mounting member having a running surface for the rotatable component. For some applications the running surface has an appropriately selected coating applied thereto.

Continuing with a previous example, an aluminum center section may be the mounting member and may be coated with a chromium surface coating, whereby the pump running surface is also coated. As the motor running surface is contiguous with the center section, the motor running surface may thus also be coated with same material as the pump running surface. In stand-alone pump applications, as another example, the mounting surface may be the end cap, and it may be entirely coated. Alternatively, only the pump running surface or a surface intended for a make-up fluid-charging pump such as a gerotor, or both, of the end cap may be coated. For some applications, the running surface is not coated. Also, the coating may be chosen such that it wears off of the running surface during operation. The advantages described herein for center sections and end caps may also be advantageous for the charge pump cover or housing. Thus, one aspect of the teachings is directed toward use of an aluminum mounting member without the need to use a conventional valve plate.

Another alternative useful in hydraulic pump and transmission applications as well as others is to use a valve plate as the mounting member and to coat the running surface of the valve plate. The valve plate is positioned between the pump or motor and a running surface of a center section or end cap.

For some applications using a cast iron end cap or center section, a zinc dichromate coating is preferred. A zinc dichromate coating provides corrosion protection while being sufficiently soft that operation of the hydraulic components is unaffected as the zinc coating wears from the running surface.

More generally, this invention is concerned with performance and aesthetic characteristics of hydraulic and hydrostatic units. Other performance characteristics of particular interest are those associated with durability, integrity, longevity, strength and lubricity.

Other benefits and objects of this invention are disclosed herein and will be obvious to readers of ordinary skill in the art. The features disclosed herein can be combined to create a unique hydrostatic transmission design; it is understood, however, that such features are unique in their own right and can be used independently with other hydrostatic unit designs, as will be obvious to one of ordinary skill in the art.

DETAILED DESCRIPTION

Figure 1:
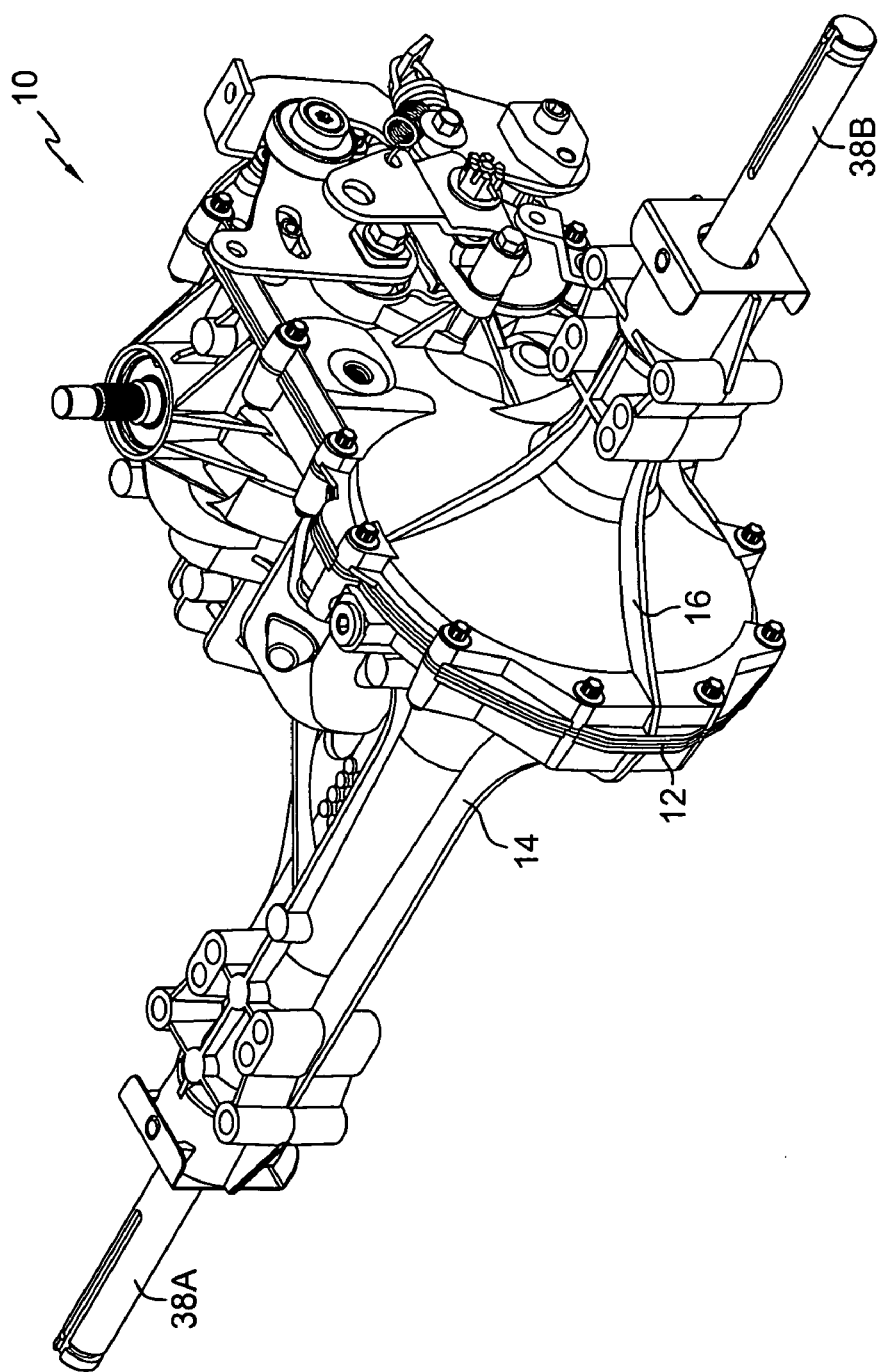
FIG. 1 is a perspective view of a standard integrated hydrostatic transmission.
Figure 2:
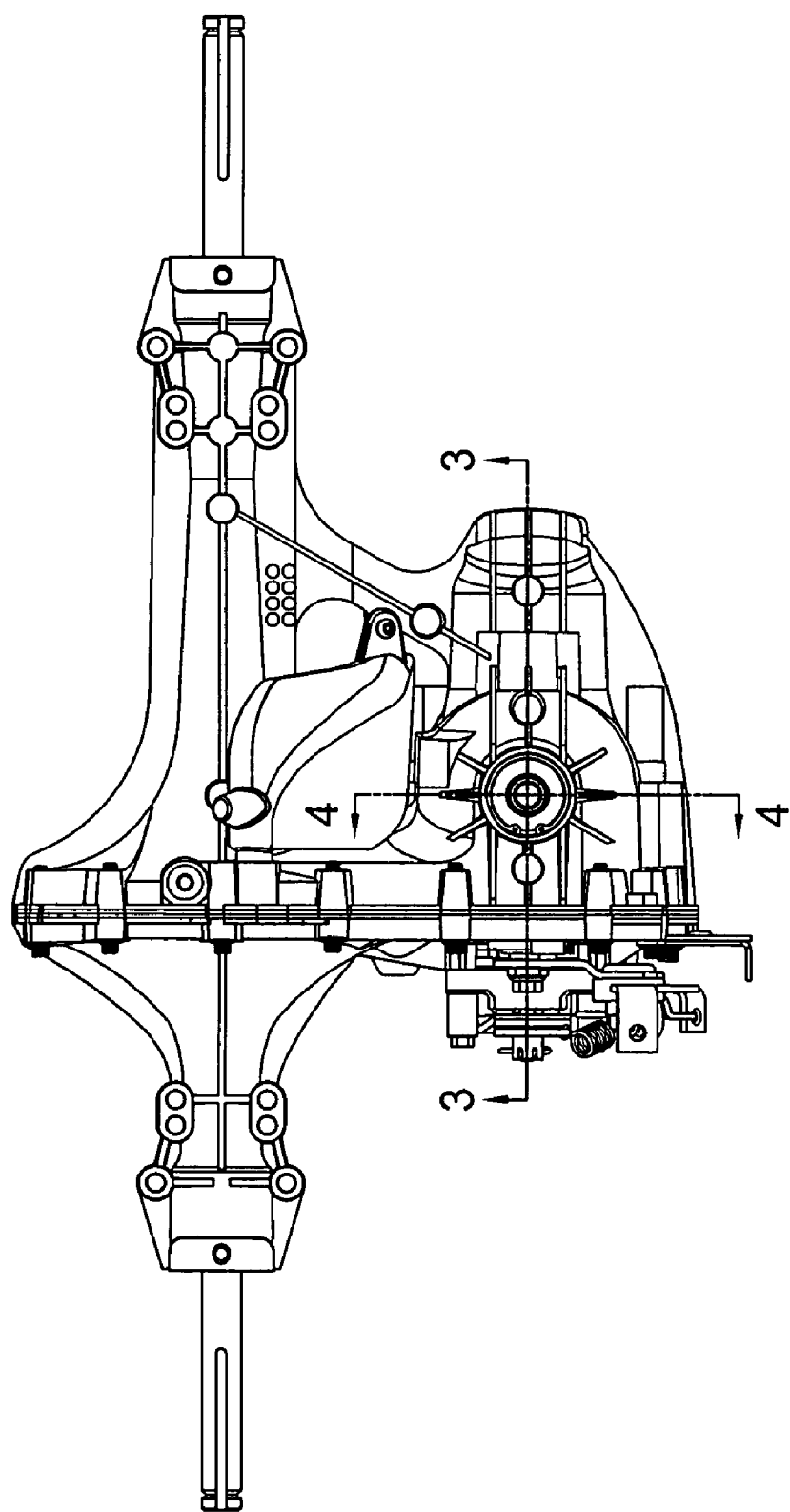
FIG. 2 is a plan view of the HST shown in FIG. 1.
Figure 3:
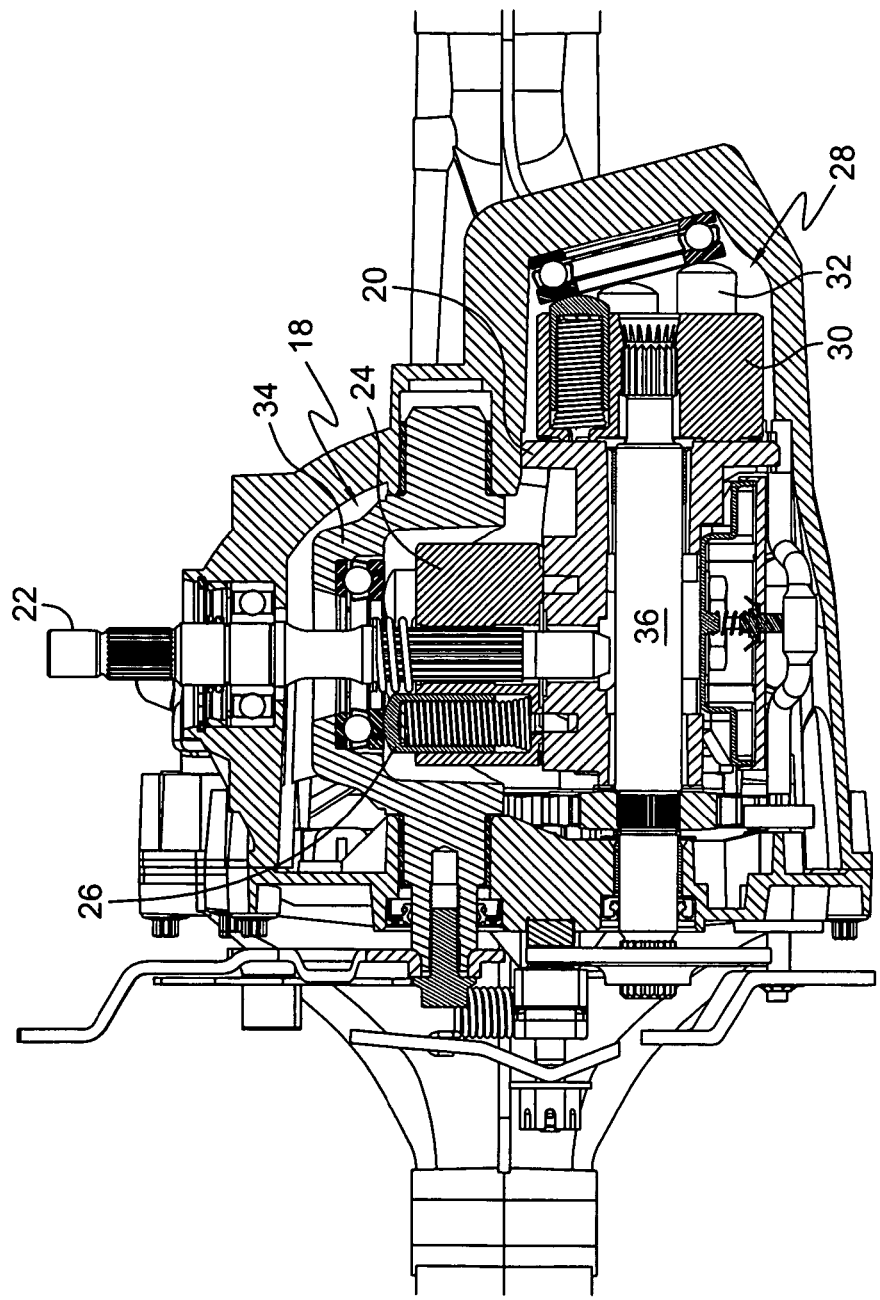
FIG. 3 is a section view along section line 3—3 shown in FIG. 2.
Figure 4:
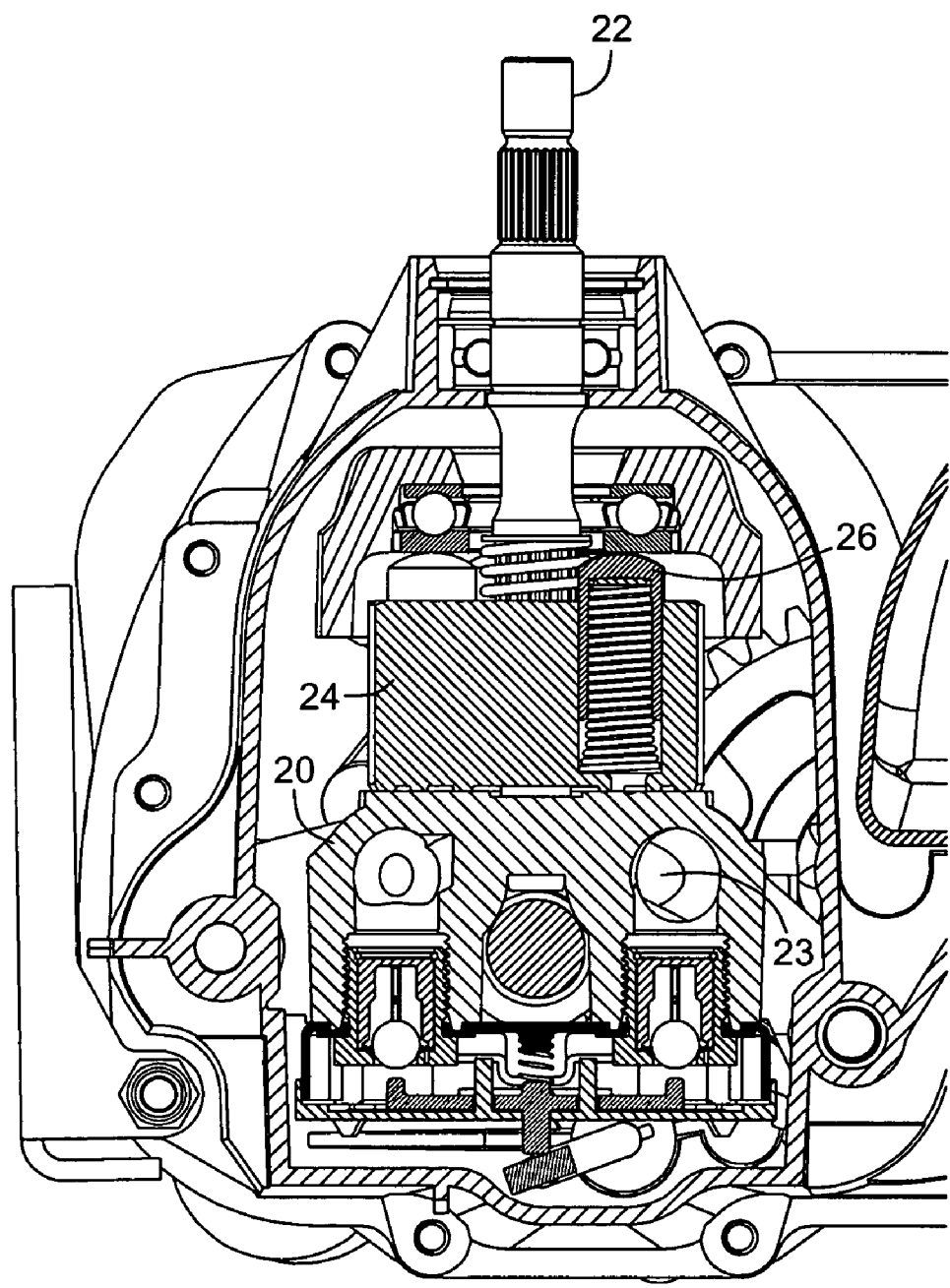
FIG. 4 is a section view along section line 4—4 shown in FIG. 2.

FIGS. 1–4 illustrate an IHT 10 configured with a vertically split housing 12 with main casing 14 and side casing 16. An embodiment of this invention is described for convenience first with respect to such an IHT unit. The arrangement of these housing elements are not a key feature of the design, as the invention does not require any specific housing configuration, and other housing configurations can be accommodated therewith. All specifics of an IHT are not shown in these figures, as the general operation of an IHT is known in the art. In general, where different embodiments of the various elements of the transmission are shown in different figures, like numerals designate like elements. It is understood that this invention is not limited to any specific design. FIG. 2 is a plan view of IHT 10 shown in FIG. 1. FIGS. 3 and 4 are section views according to corresponding section-lines shown in FIG. 2.

Figure 5:
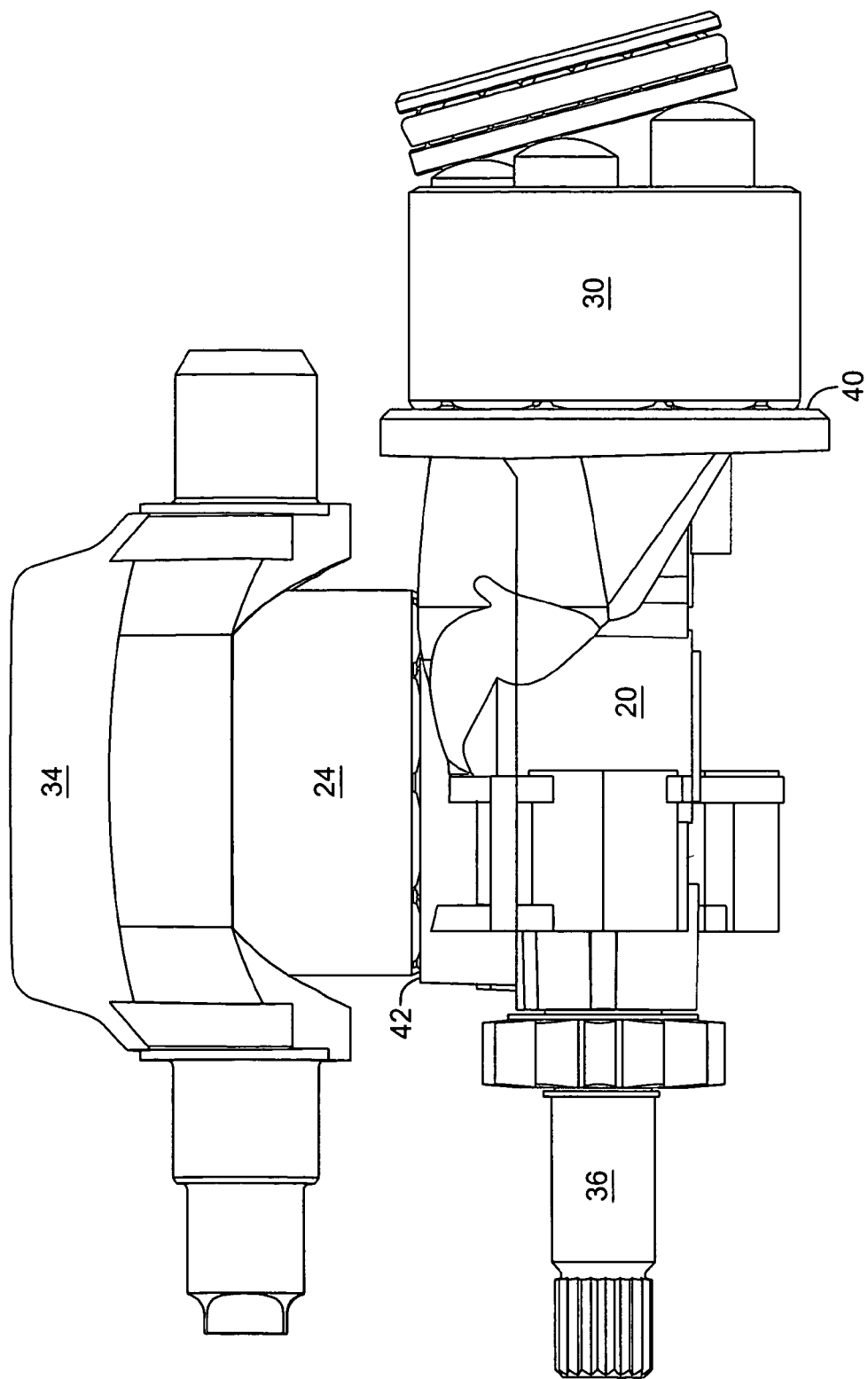
FIG. 5 is a side view of a center section oriented similar to that shown in FIG. 3.

Pump 18 is disposed on center section 20 and receives input shaft 22, which communicates with and is driven by a vehicle engine (not shown). Center section 20 includes internal porting 23 that hydraulically connects pump 18, which comprises pump cylinder block 24 and pump pistons 26, and a hydraulic motor 28, which comprises a motor cylinder block 30 and motor pistons 32. Pump pistons 26 engage adjustable swash plate 34 to create pressure within internal porting 22. FIG. 5 shows a side view, similar to that of FIG. 3, in which components have been removed for clarity.

Motor cylinder block 30 is connected to and drives output shaft 36, which in turn drives various gears, including a differential. The differential is in turn operatively connected to the output drive axles 38A and 38B of the vehicle.

Figure 6:
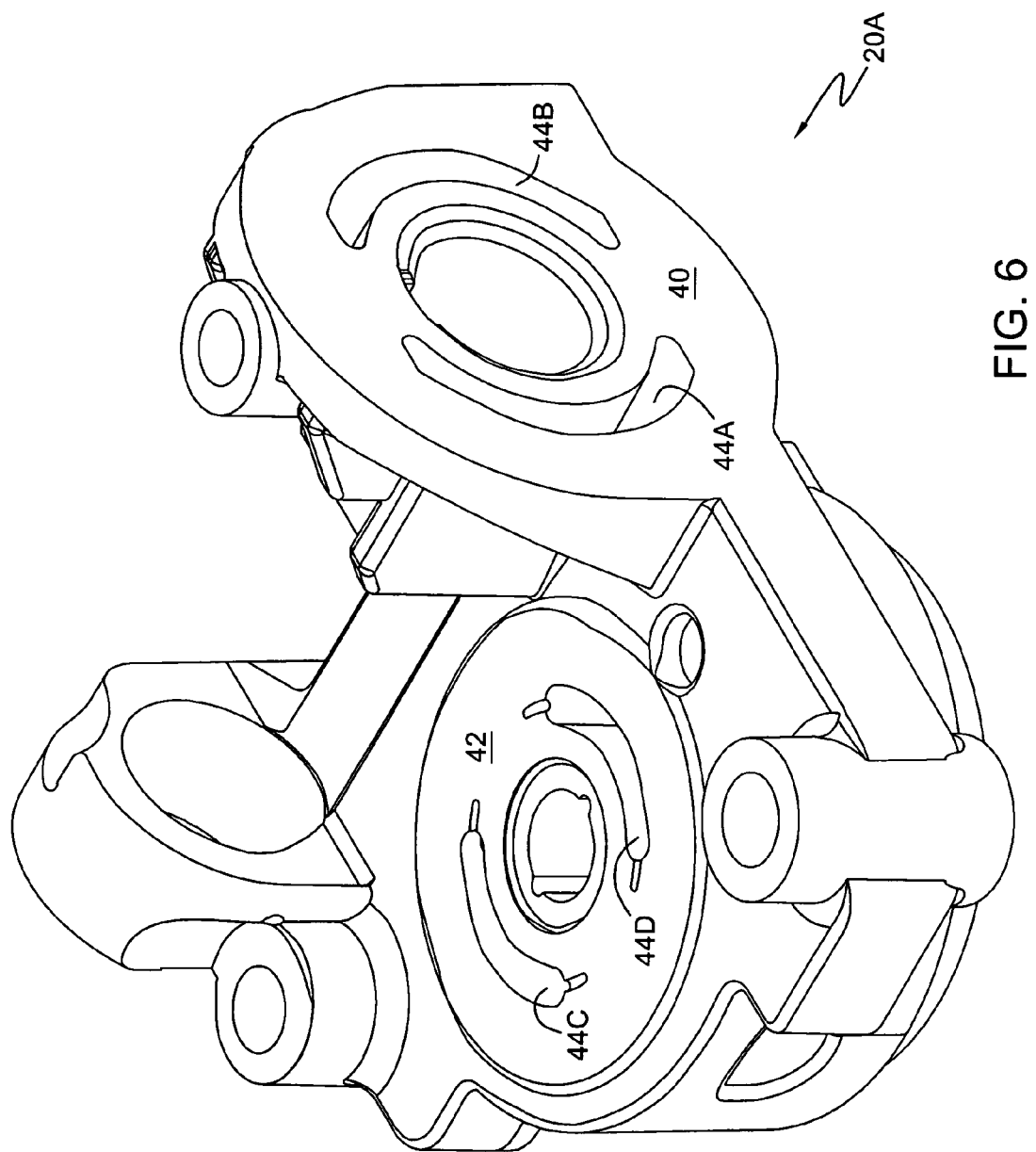
FIG. 6 is a perspective view of a species of center section.
Figure 7:
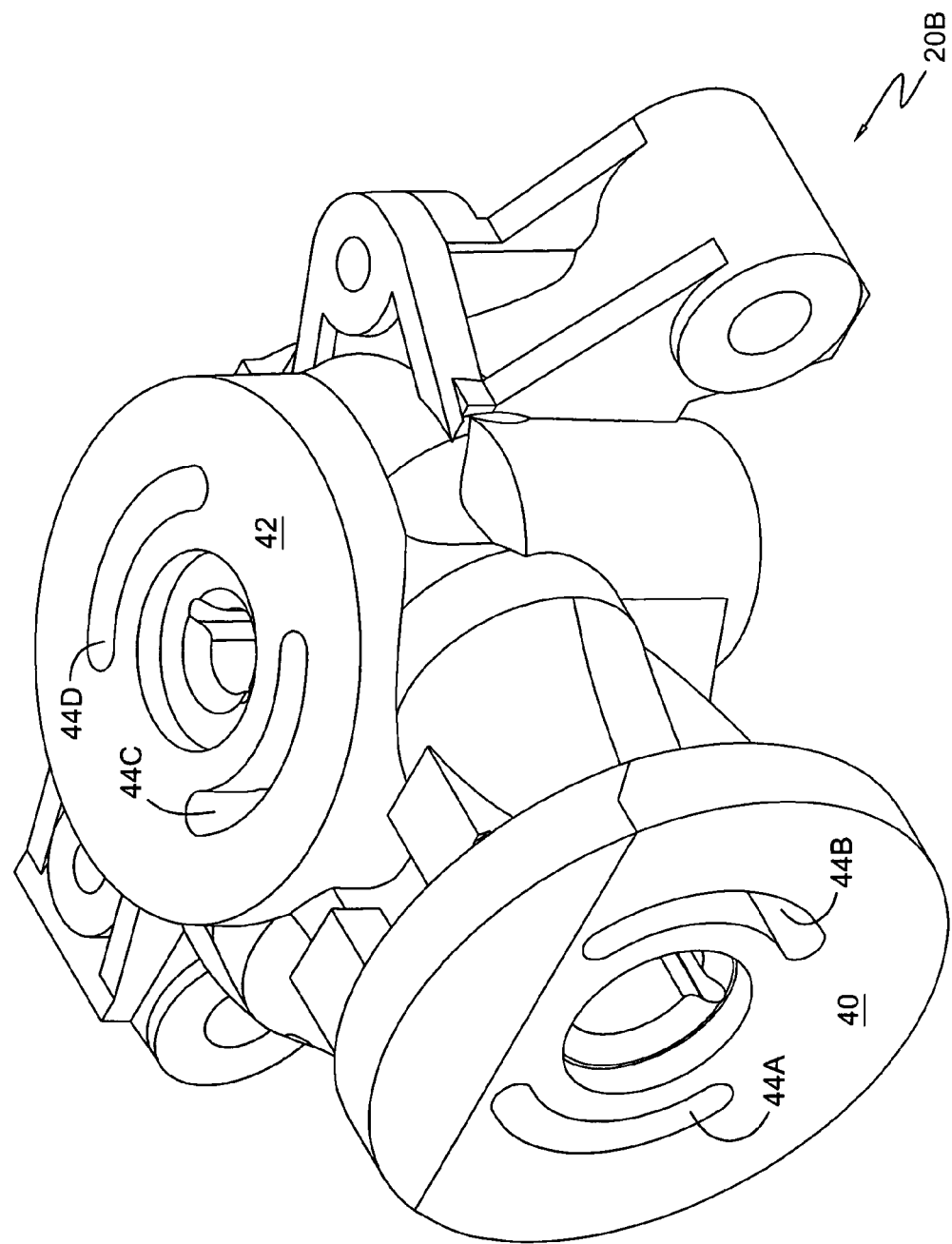
FIG. 7 is a perspective view of another species of center section.

FIGS. 6 and 7 show different species of center section 20, 20A and 20B, respectively. The present invention is not limited to any particular center section species and may include, for example, plate-like center sections. As shown in FIGS. 5–7, center section 20 has a motor running surface 40 and a pump running surface 42, on which motor cylinder block 30 and pump cylinder block 24 are respectively mounted for rotation. Center section 20 acts as, among other things, a mounting unit (or mounting member) for pump 18 and motor 28 of hydrostatic transmission 10.

The hydraulic circuit in such a unit is integrally formed as porting 22 in center section 20, although other alternative embodiments could be used. Such a hydraulic circuit generally has a high pressure side and a low pressure, or vacuum side. Arcuate ports 44A and 44B are formed in motor running surface 40 and arcuate ports 44C and 44D are formed in pump running surface 42, and each such port corresponds to either the high pressure or low pressure sides of the hydraulic circuit.

Figure 8:
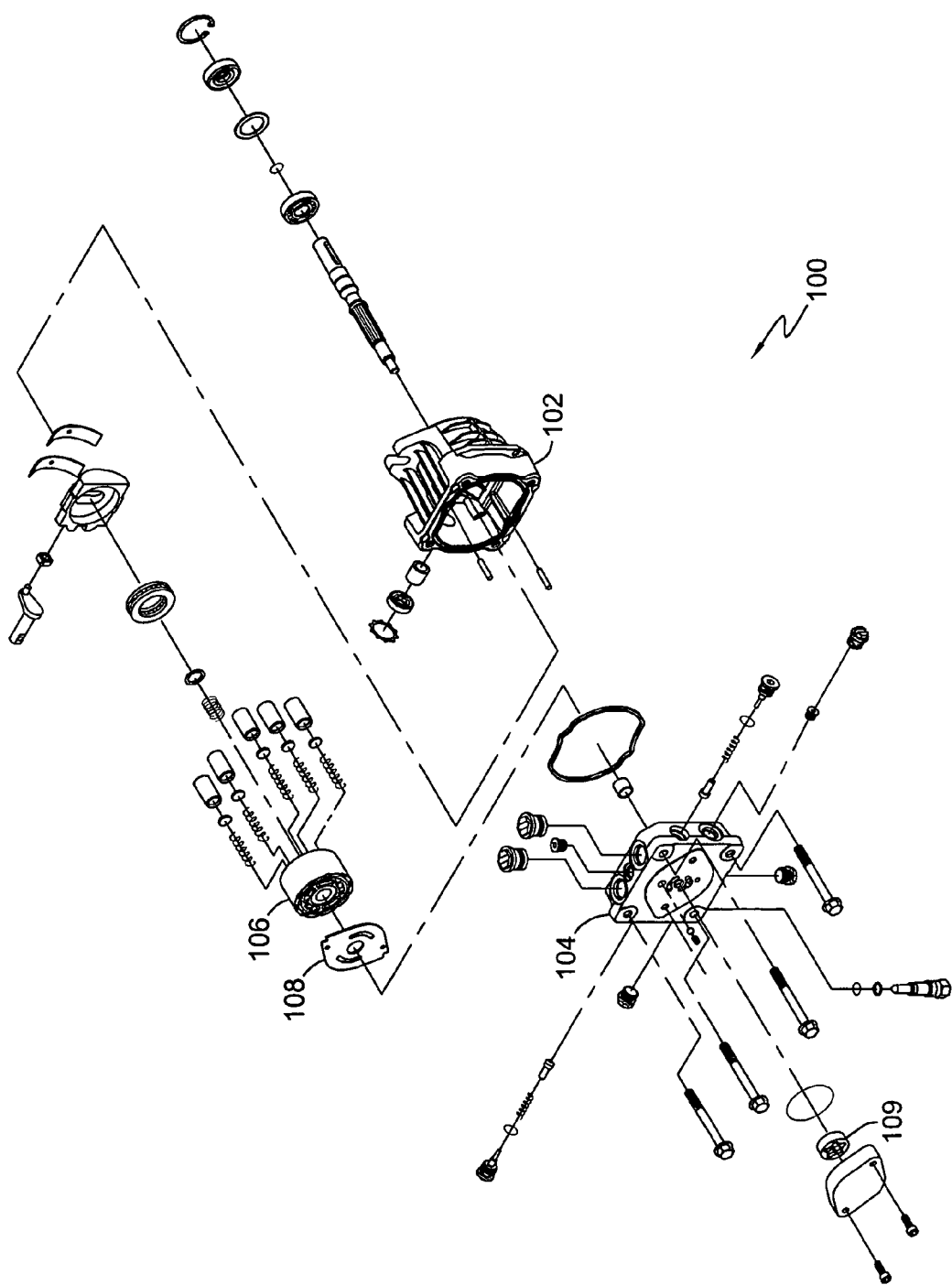
FIG. 8 is an exploded perspective view of a stand alone hydrostatic pump.

FIG. 8 shows a stand alone bantam duty pump unit 100 having a pump housing 102 and an end cap 104. Often the end cap 104, which may act as a mounting member, has a running surface on which pump cylinder block 106 rotates.

Figure 12:
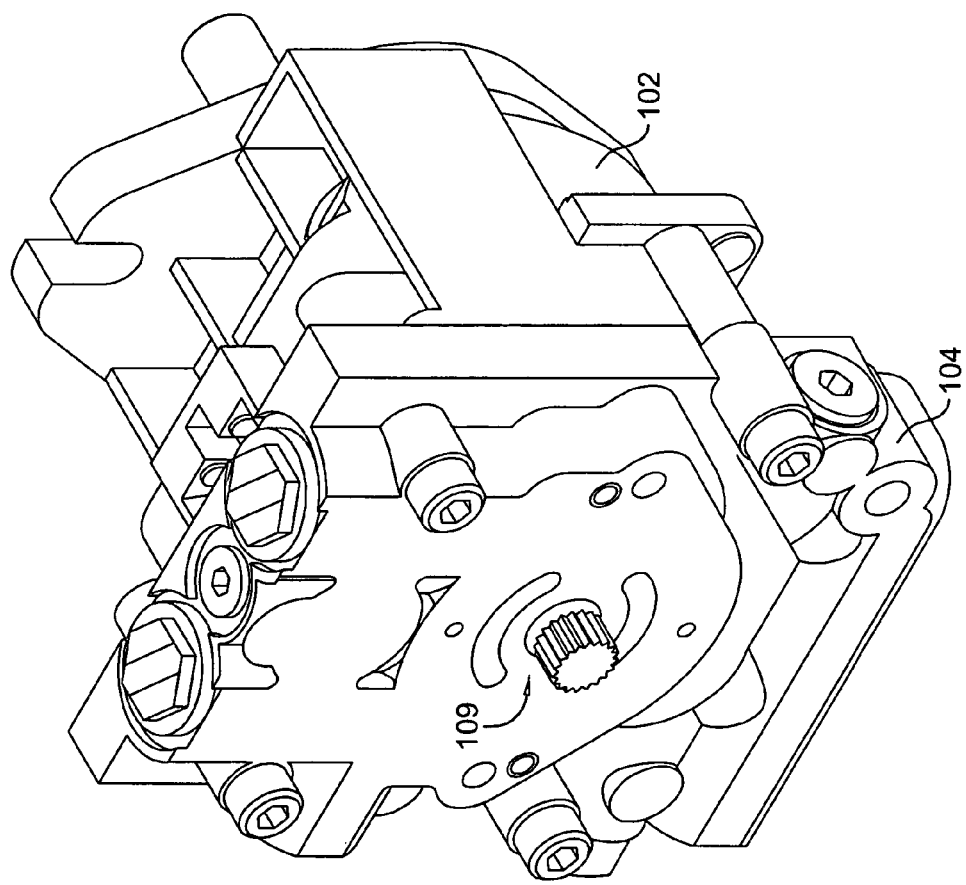
FIG. 12 is a perspective view of a stand alone hydrostatic pump similar to the one shown in FIG. 8. The gerotor is removed to show the gerotor running surface.
Figure 13:
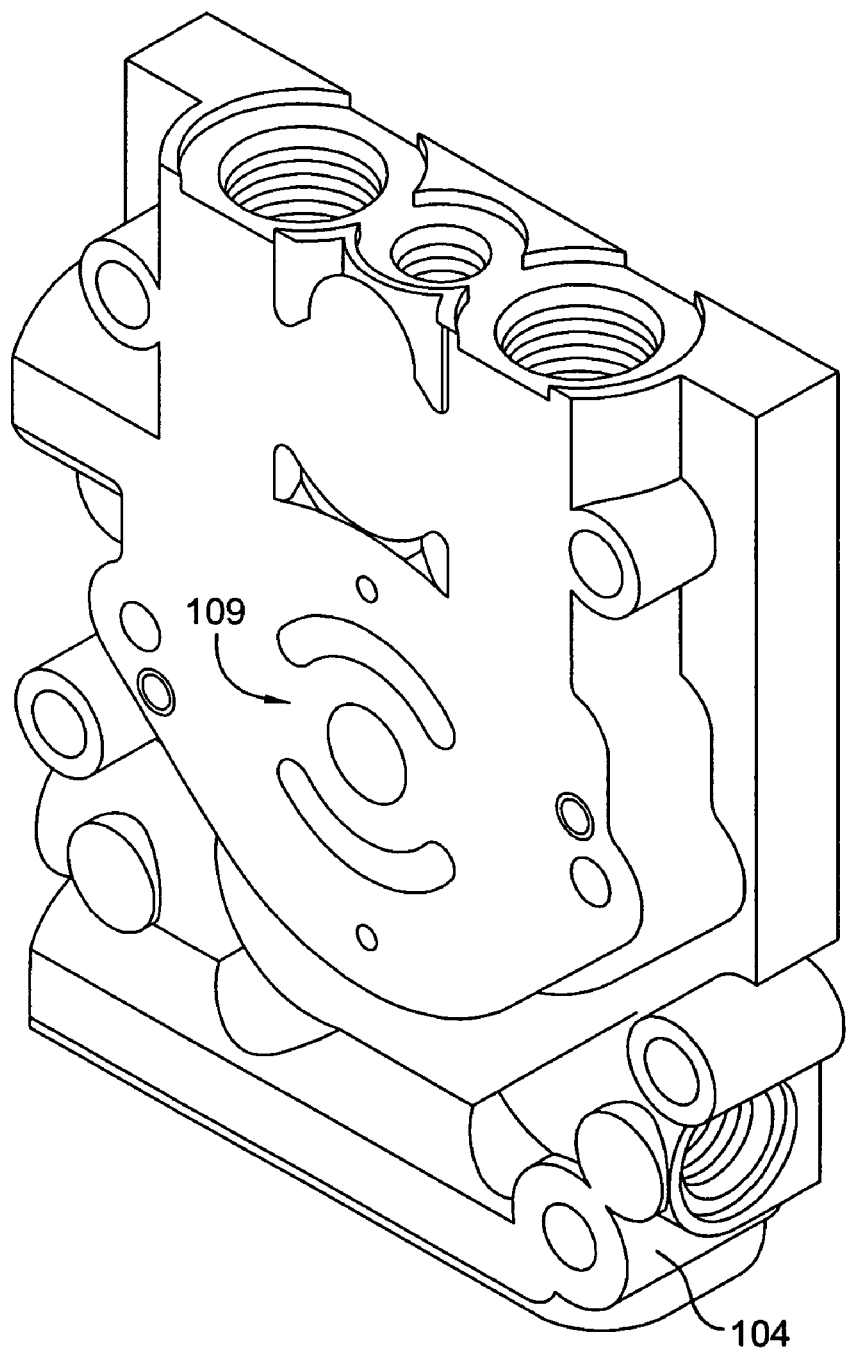
FIG. 13 is a perspective view of the end cap shown in FIG. 12.

The pump 100 shown in FIG. 8, however, has a valve plate 108 between the pump cylinder block 106 and the end cap 104; the valve plate 108 thereby becomes, or functions as, a mounting member, having a running surface for the pump cylinder block 106. The gerotor is labeled reference number 107. FIG. 12 shows the gerotor running surface 109.

Figure 9:
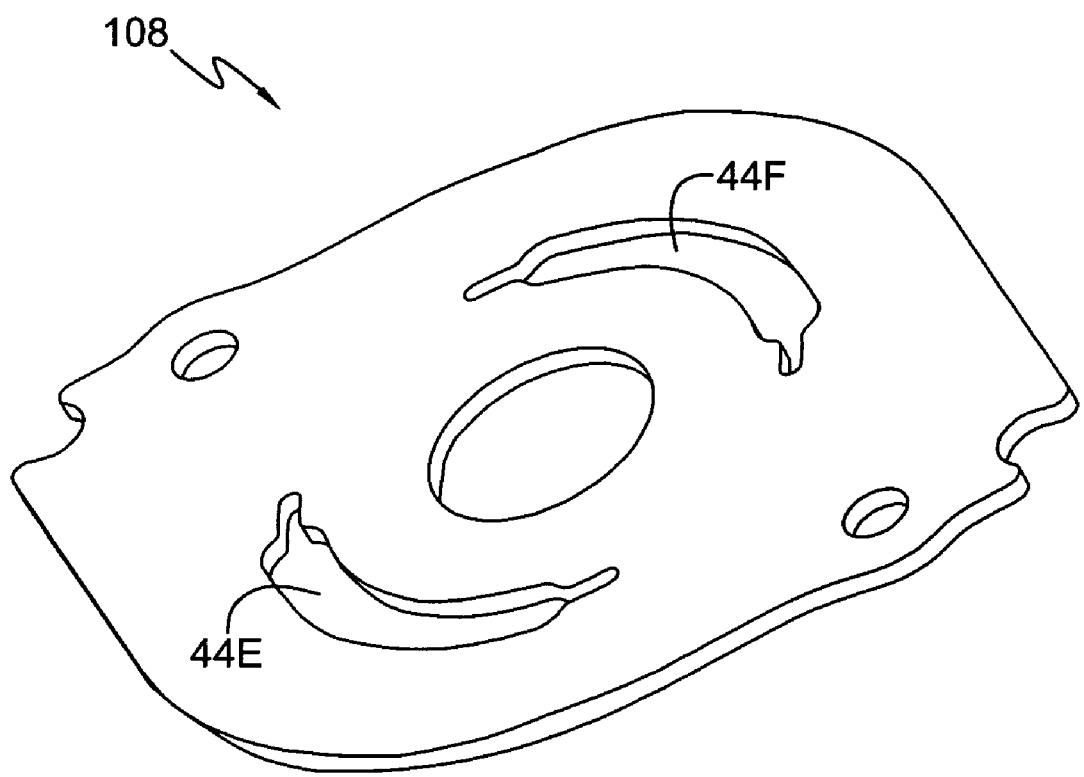
FIG. 9 is a perspective view of a valve plate having arcuate ports.

Referring to FIG. 9, the valve plate 108 has arcuate ports 44E and 44F. Arcuate ports 44E and 44F are adapted to allow hydraulic fluid to flow between a pump and an end cap, for example. Other porting configurations are acceptable as well.

One hydrostatic design using an aluminum center section, e.g., 20B, includes a valve plate 108 between the center section 20B and the pump cylinder block 24 or the motor cylinder block 30. Note that pump cylinder block 24 and pump cylinder block 106 are equivalent with respect to the scope of the invention; different reference numbers have been used to aid description of figures.

Problems such as those discussed in the background section may be solved by applying a surface coating to a running surface of a mounting member such as center section 20, end cap 104, or valve plate 108, for example. Other embodiments do not include coating the running surface(s).

Coatings that could be used for this process include ceramic, zinc plating or chromium or nitro-carburization; more generally, a material need only exhibit acceptable hardening and frictional characteristics for the specific application in question. U.S. Pat. No. Nos. 4,596,611 and 4,496,401 are relevant to nitro-carburizing treatments and are incorporated herein by reference.

Figure 10:
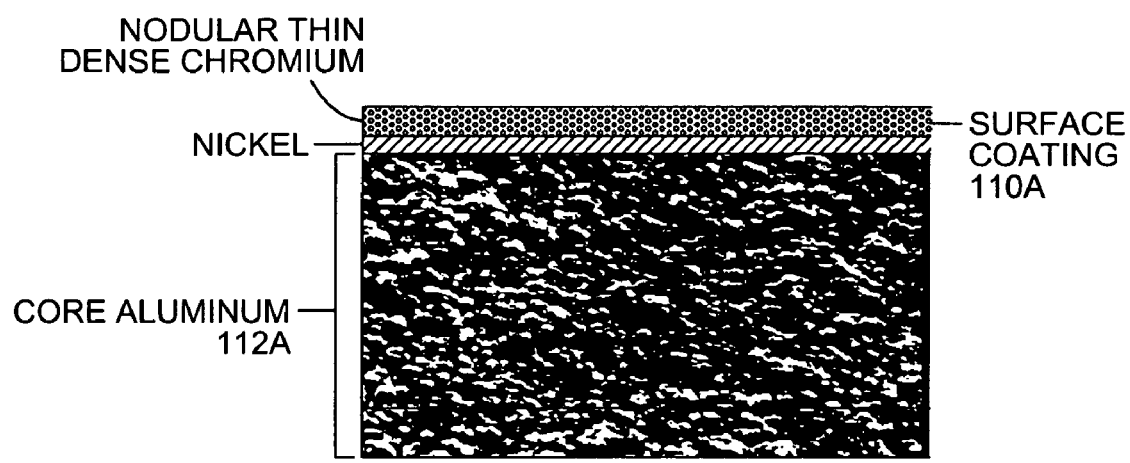
FIG. 10 is a side view of an aluminum core that has been nickelized prior to application of a surface coating.
Figure 11:
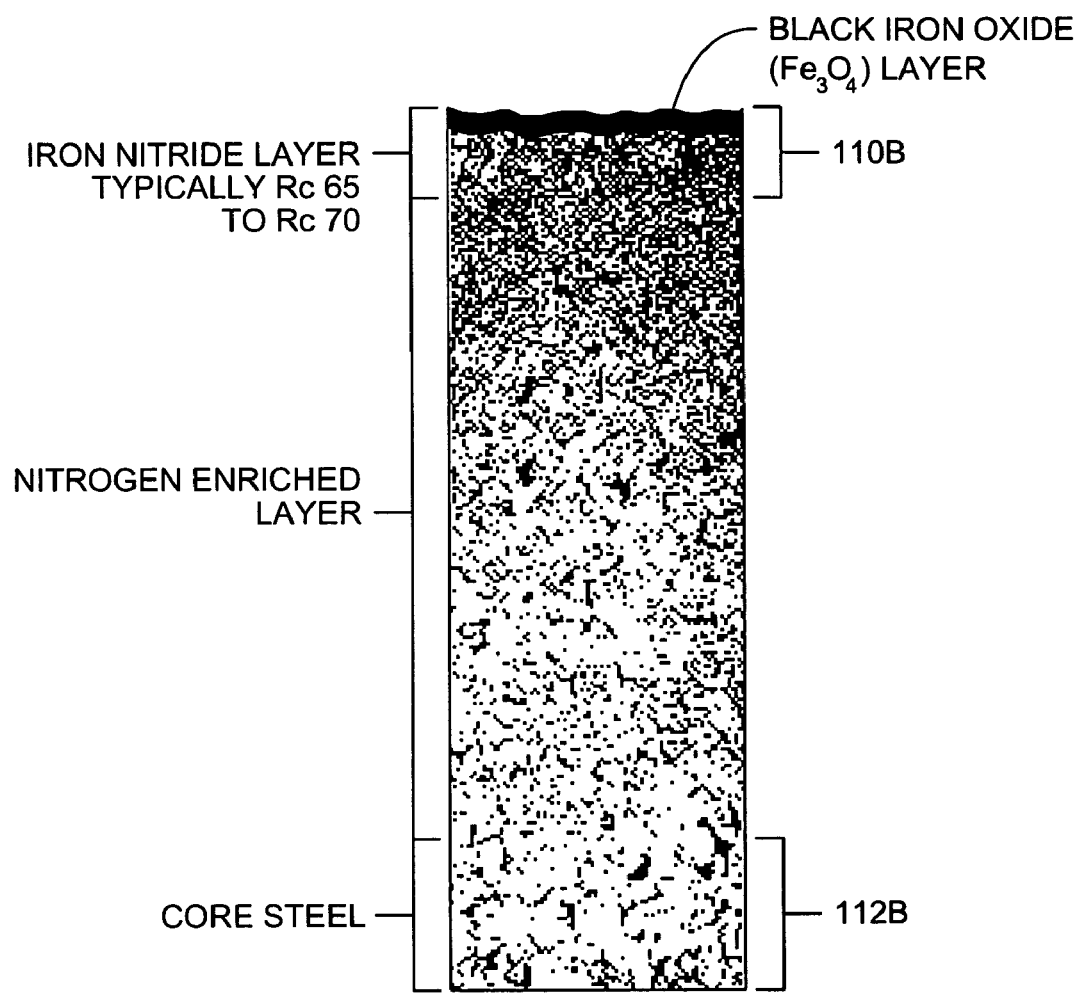
FIG. 11 is a side view of a steel core wherein a surface coating has been applied through nitro-carburizing.

FIG. 11 depicts a surface coating 110B resulting from treatment of a steel core 112B. The embodiments depicted in FIGS. 10 and 11 are examples; other core (e.g., running surface) materials may be coated with these or other coatings, or combinations of coatings and treatments.

FIG. 10 depicts a surface coating 110A comprising nodular thin dense chromium applied to the core 112A. For some applications, it is desirable to prepare the surface of the mounting member prior to applying the separate coating. For example, an aluminum center section benefits from a nickelizing process prior to applying a surface coating such as chromium. The core 112A is aluminum and has been nickelized prior to application of the surface coating 110A. In an alternative embodiment, core 112A may be anodized prior to the coating application. A preferred embodiment of the present invention involves the use of such a coating on an aluminum center section or end cap. The use of a surface coating allows for the use of a standard rotating kit and aluminum center section without the need for an additional piece such as a valve plate.

A preferred embodiment for a cast-iron unit, such as an end cap, would include use of zinc plating during the manufacturing process. More generally, this invention is concerned with aesthetic and performance characteristics of hydrostatic units, and in particular characteristics associated with running surfaces. Performance characteristics of particular interest are those associated with durability, integrity, longevity, strength and lubricity. Surface corrosion susceptibility of a cast-iron end cap, for example, may generally be considered an aesthetic characteristic.

Thus, an embodiment of a hydrostatic unit according to the teachings herein may comprise a rotatable component of a device selected from the group consisting of a hydrostatic motor and a hydrostatic pump. The rotatable component may, for example, be a cylinder block 24 of a hydrostatic pump 18. A running surface of a mounting member for the rotatable component has (in some embodiments) a surface coating applied thereto. Continuing with the example, an aluminum center section 20 may be coated with a chromium surface coating 110A, whereby the pump running surface 42 is also coated. Thus, the motor running surface 40 may be coated with essentially the same material as the pump running surface 42.

Figure 14:
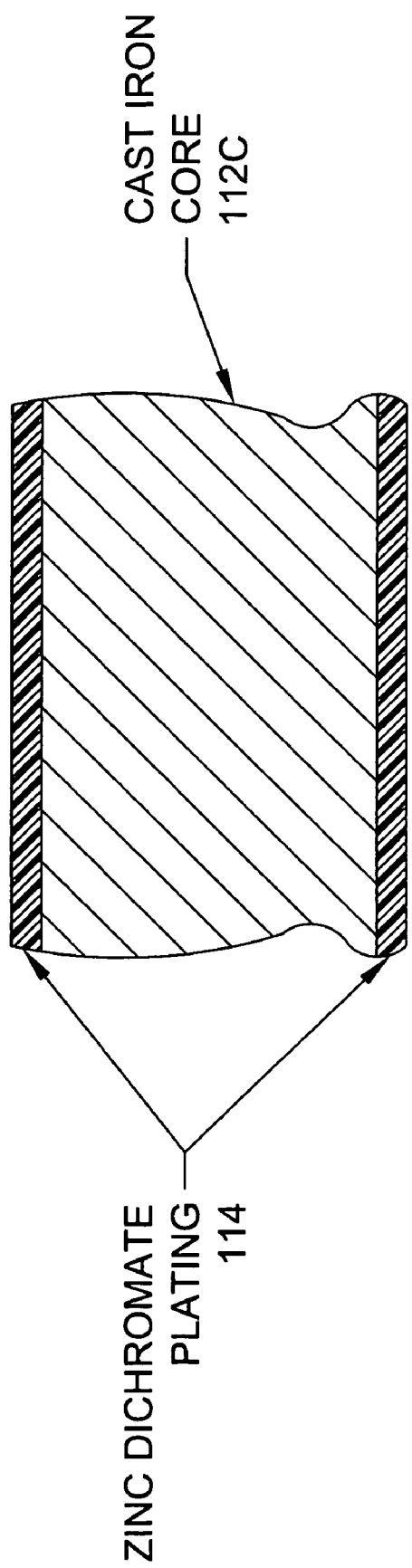
FIG. 14 is a cross-section view of an iron core with zinc dichromate plating on both sides to function as the surface coating.

In stand-alone pump applications, for example, the end cap 104 may be entirely coated, or only the pump running surface 42 of end cap 104 may be coated. For some applications, it is not material if the coating wears off the running surface. For some applications, it is desirable to select a coating that will wear off the running surface during operation without reducing performance of a vehicle, for example, after a break-in period. The latter approach retains the benefits of the substrate, e.g., the running surface.

Where the end cap is manufactured from cast iron, a coating such as zinc plating 114 is preferably applied electrostatically and should be applied prior to assembly. The zinc plating shown in FIG. 14 is zinc dichromate plating applied to a cast iron core 112C. The entire end cap 104, including the gerotor running surface 109 and pump running surface (not shown in the end cap views), could be plated in such a manner, thus simplifying the manufacturing process. To the extent the running surface is also plated, the zinc plating 114 will be removed by interaction with, e.g., the rotating cylinder block 106. Such removal will not affect performance in any way, and cosmetic concerns are less of an issue because the running surface is internal. To the extent desired, the end cap could be plated in such a way to avoid plating the running surface.

For some applications, the maximum desirable zinc dichromate plating thickness has empirically been determined to be 0.0002 inches for both the gerotor running surface 109 and the pump running surface. Greater thicknesses, however, may be useable if the variation in thickness across the running surface is small enough that it does not result in a loss of efficiency and performance. Also, even though soft zinc dichromate is readily removed from the running surfaces through normal operation, the removal is generally uniform. Thus, the running surfaces remain sufficiently flat to achieve nominal operating pressure in the unit, and thus avoid wobble and nutation (which result in surface gouging) caused by the pump lifting from the running surface, for example. Another benefit to using zinc dichromate is that zinc dichromate particles removed by the cylinder block are small enough and soft enough that they do not block the filter and thus the life and performance of moving components in the unit are not adversely affected.

If the zinc dichromate plating is non-uniform, initial performance may be less than with a non-plated end cap. As the cylinder block rotates, however, it removes the non-uniformity and efficiency, thus, slowly increases to the level of a non-plated surface. Such break-in time may be accounted for during the manufacturing phase or during a vehicle over-all break-in phase, for example. Generally, it is more desirable, however, to achieve uniform plating at the outset. A further advantage observed from experimentation with zinc dichromate is that at 0.0002 thickness, there has not been a build up in bore holes to cause operational or assembly problems. To compensate for such problems associated with other thicknesses or surface coatings, bore diameter adjustments, consistent with the thickness of the coatings, may be required.

Another alternative, useful, for example, with hydrostatic transmission, hydrostatic transaxle and hydrostatic pump applications, is to coat the running surface of the valve plate 108. The valve plate 108 is positioned between the pump 18 or motor 28 and a running surface, e.g. 42 or 40, of a center section 20; similarly the valve plate 108 may be interposed between the pump cylinder block 106 and the end cap 104.

A preferred coating for an aluminum center section is available from ARMOLOY® of Illinois, Inc. of Dekalb, Ill. An alternate preferred coating for a valve plate is available from FPM Ipsen of Cherry Valley, Ill. sold under the trademark "Nitrotec" (hereinafter "a nitrotec coating."). Coating as used in this document is intended to include the concept of surface treatment (e.g., see FIG. 11.), except where distinction is set forth.

It is to be understood that the above description of the invention should not be used to limit the invention, as other embodiments and uses of the various features of this invention will be obvious to one skilled in the art. This invention should be read as limited by the scope of its claims only.

What is claimed is:

1. A hydraulic pump comprising:
   a housing having an opening formed in one end thereof;
   an end cap affixed to the housing to close the housing opening;
   a valve plate disposed inside the housing on an internal surface of the end cap, wherein the valve plate has been subjected to a nitrocarburization heat treatment process;
   a cylinder block disposed inside the housing and mounted on the valve plate, whereby the cylinder block rotates on a surface of the valve plate; and
   an input shaft extending through the first end of the housing and engaging the cylinder block.

2. The hydraulic pump of claim 1, further comprising a gerotor charge pump affixed to an external surface of the end cap, and wherein the input shaft extends through the end cap to drive the gerotor charge pump.

* * * * *